No. 881,499. PATENTED MAR. 10, 1908.
J. TANCK & J. C. JOHNSON.
AXLE SKEIN.
APPLICATION FILED APR. 1, 1907.

Witnesses
Edwin F. Frey
Lucy B. Hills

Inventors
Julius Tanck
John C. Johnson
Edwin L. Yewell
Attorney

THE NORRIS PETERS CO., WASHINGTON, D. C.

UNITED STATES PATENT OFFICE.

JULIUS TANCK AND JOHN C. JOHNSON, OF KENOSHA, WISCONSIN.

AXLE-SKEIN.

No. 881,499.　　　Specification of Letters Patent.　　Patented March 10, 1908.

Application filed April 1, 1907. Serial No. 365,743.

*To all whom it may concern:*

Be it known that we, JULIUS TANCK and JOHN C. JOHNSON, citizens of the United States, residing at Kenosha, in the county of Kenosha and State of Wisconsin, have invented new and useful Improvements in Axle-Skeins, of which the following is a specification.

Figure 1:
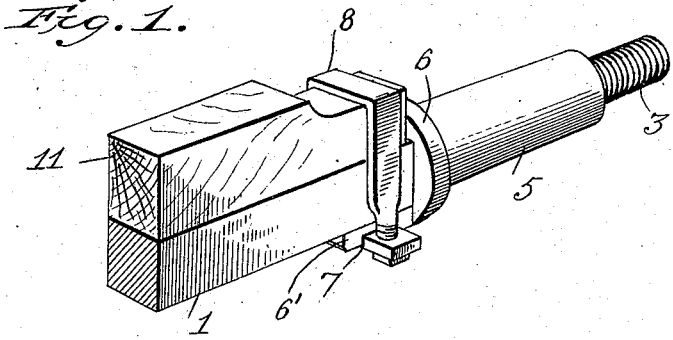
Figure 2:
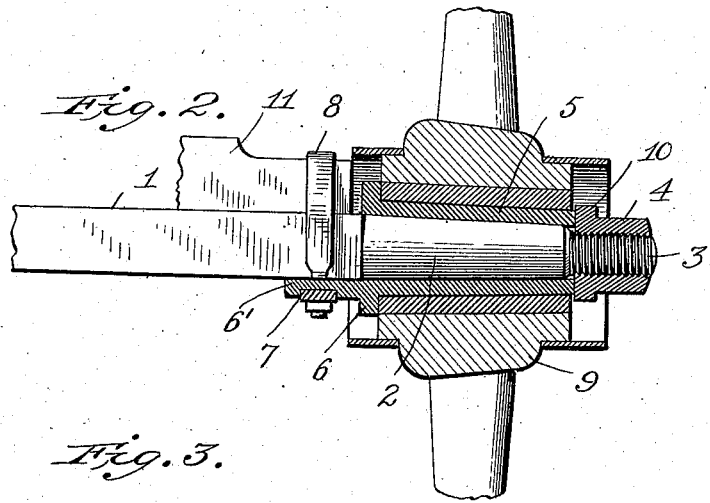
Figure 3:
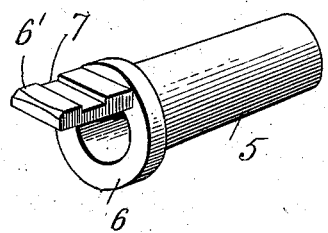

Our invention relates to axle sleeves or skeins and has for its object certain improvements in the construction of the same as will be hereinafter more definitely set forth and pointed out in the claims annexed hereto, reference being had to the accompanying drawing in which Figure 1 is a perspective view of one end of a metallic axle showing my improvement in position thereon. Fig. 2 is a longitudinal sectional view of the sleeve or skein and a wheel hub, the axle being shown, in full lines. Fig. 3 is a detail perspective view of my improved sleeve or skein, shown inverted.

Similar numerals of reference denote corresponding parts in the several views.

In the said drawing the reference numeral 1 denotes the body of the axle, the same being preferably formed of metal and being formed rectangular in cross section. Extending from, and formed integral with, said body portion 1 are the rounded and tapering hub-receiving ends, but one of which, at 2, being shown, each of said ends being extended into a reduced screw threaded projection 3 adapted to receive the usual hub retaining nut 4. Removably mounted on each of the ends 2 is my improved sleeve or skein 5, the same being internally apertured to snugly fit said end 2, and being provided at its inner end with an enlarged portion or collar 6, and with a lip 6' formed integral therewith, said lip being adapted to engage against one of the flat faces of the body 1 of the axle as shown, whereby rotation of said sleeve or skein 5 on its axle end 2 is effectually prevented, and being provided on its outer surface with a groove or recess 7, adapted to receive a retaining clip 8, whereby the withdrawal of said sleeve or skein is prevented.

With the parts assembled, as shown in Fig. 2, the wheel hub 9 is mounted on the sleeve or skein 5 to rotate freely thereon, the nut 4 being formed with an inner shoulder 10 wide enough to project beyond the edge of said sleeve or skein 5 and retain said hub 9 in position. By providing the groove or recess 7 in the lip 6' of the sleeve or skein 5 we effectually prevent the withdrawal of said sleeve or skein with the hub 9 when the latter is removed.

It will be understood that the clips 8 instead of being merely retaining clips may be formed to constitute the thill clips of the vehicle.

It will be observed that the hub receiving portion of the sleeve or skein 5 is slightly wider than the wheel hub 9 and that said sleeve or skein 5 when in position is slightly longer that the rounded hub-receiving end 2 and extends over the reduced threaded portion, the result being that when the nut 4 is screwed into position said sleeve or skein is forced thereby to its innermost position, leaving an annular recess between the nut and the hub receiving end for the reception of oil or grease while at the same time there can be no binding of the wheel hub 9. The recess so formed serves to effectually supply sufficient lubricant to the face of the nut adjacent to the hub by oozing through the joint between said nut and the sleeve on the under side, it being carried around the face of said nut by the metal lining of the hub during the rotation of the wheel, thus preventing grinding of the hub lining, caused by grit settling and hardening between said nut and said lining. By keeping the inner face of said nut sufficiently lubricated we effectually prevent undue tightening of the nut when the wheel is running in one direction, and any loosening of said nut when said wheel is running in the opposite direction.

As shown in Figs. 1 and 2, in heavy wagons we prefer to locate on top of the axle 1 a wooden bolster 11, around the ends of which the clips 8 will be engaged, which will serve not only to hold the sleeve 5 in place but will also secure said bolster to the axle.

Having thus described our invention, what we claim as new and desire to secure by Letters Patent, is:

The combination with an axle formed into an angular body portion, a rounded hub receiving portion, and a reduced screw-threaded projection, of a removable sleeve or skein having a collar at one end and mounted on said hub receiving end, and projecting over said reduced threaded portion, thus forming an annular recess at the end of the hub receiving end, means for retaining said sleeve in position comprising a lip extending from said collar and formed integral therewith and having a recess adapted to receive a clip, and a nut mounted on the reduced threaded portion of said axle and adapted to force said sleeve in position and to retain said hub.

In testimony whereof we affix our signatures, in presence of two subscribing witnesses.

JULIUS TANCK. [L. S.]
JOHN C. JOHNSON. [L. S.]

Witnesses:
CHARLES A. TARBELL,
MARTHA SCHUMACHER.